US012757124B2

(12) United States Patent
Mao et al.

(10) Patent No.: US 12,757,124 B2
(45) Date of Patent: Oct. 6, 2026

(54) DOWNLINK POWER CONTROL FOR WIRELESS POWER TRANSFER

(71) Applicant: Nokia Technologies Oy, Espoo (FI)

(72) Inventors: Xiaomao Mao, Massy (FR); Rapeepat Ratasuk, Naperville, IL (US)

(73) Assignee: Nokia Technologies OY, Espoo (FI)

( * ) Notice: Subject to any disclaimer, the term of this patent is extended or adjusted under 35 U.S.C. 154(b) by 334 days.

(21) Appl. No.: 18/530,438

(22) Filed: Dec. 6, 2023

(65) Prior Publication Data

US 2024/0276391 A1 Aug. 15, 2024

Related U.S. Application Data

(60) Provisional application No. 63/444,645, filed on Feb. 10, 2023.

(51) Int. Cl.
*H04W 52/24* (2009.01)
*H04W 52/42* (2009.01)

(52) U.S. Cl.
CPC ......... *H04W 52/242* (2013.01); *H04W 52/42* (2013.01)

(58) Field of Classification Search
CPC .... H04W 52/24; H04W 52/42; H04W 52/242
See application file for complete search history.

(56) References Cited

U.S. PATENT DOCUMENTS 9,800,059 B2 * 10/2017 Reynolds .............. H04W 52/24
10,236,726 B2 3/2019 Khan et al.
11,081,910 B2 * 8/2021 Vukovic ................. H02J 50/20
11,133,717 B2 * 9/2021 Reynolds ................ H02J 50/20
11,824,604 B2 * 11/2023 Che ....................... H04B 7/0456
11,825,293 B2 * 11/2023 Zhou .................. H04B 7/06964
11,917,556 B2 * 2/2024 Abotabl .................. H02J 50/80
11,956,048 B2 * 4/2024 Li ........................ H04B 7/06952
12,045,115 B2 * 7/2024 Yoshida ................ G06F 1/3275
RE50,375 E * 4/2025 Jung ....................... H04B 5/263
2015/0229133 A1 * 8/2015 Reynolds .............. H04W 52/24 307/24
2015/0289276 A1 10/2015 Goussard
2020/0266669 A1 * 8/2020 Paidimarri .............. H02J 50/90
(Continued)

FOREIGN PATENT DOCUMENTS

EP 3387769 B1 * 4/2019 ............... H04L 1/08
EP 3799330 A1 * 3/2021 ......... H04B 7/06964
(Continued)

OTHER PUBLICATIONS

"New SID: Study on Energy Harvesting enabled Communication Services in 5GS", 3GPP TSG-SA1 Meeting #97e, S1-220118, Agenda: 4, OPPO, Feb. 14-24, 2022, 5 pages.
(Continued)

*Primary Examiner* — Hai V Nguyen
(74) *Attorney, Agent, or Firm* — Harness, Dickey & Pierce, P.L.C.

(57) ABSTRACT

In a system, apparatus, method, and non-transitory computer readable medium, a radio access network (RAN) node may be caused to, determine a wireless power transmission (WPT) control parameter associated with at least one beam based on at least a pathloss associated with the at least one UE device receiving the at least one beam, and transmit a WPT signal on the at least one beam based on the WPT control parameter.

20 Claims, 5 Drawing Sheets

(56) References Cited

U.S. PATENT DOCUMENTS

| | | | | |
|---|---|---|---|---|
| 2020/0266673 | A1* | 8/2020 | Reynolds | H02J 50/20 |
| 2020/0313469 | A1* | 10/2020 | Vukovic | H02J 50/20 |
| 2020/0351931 | A1* | 11/2020 | Babaei | H04W 52/365 |
| 2021/0100059 | A1* | 4/2021 | Xu | H04W 76/19 |
| 2021/0194292 | A1 | 6/2021 | Duhovnikov et al. | |
| 2022/0038165 | A1* | 2/2022 | Li | H04B 7/06952 |
| 2022/0078779 | A1 | 3/2022 | Xu et al. | |
| 2022/0200661 | A1 | 6/2022 | Lee et al. | |
| 2022/0232476 | A1* | 7/2022 | Reial | H04W 24/10 |
| 2022/0352751 | A1* | 11/2022 | Elshafie | H02J 50/23 |
| 2023/0094601 | A1* | 3/2023 | Xu | H04L 5/0094 370/318 |
| 2023/0098113 | A1* | 3/2023 | Xu | H04B 17/347 455/522 |
| 2023/0308237 | A1* | 9/2023 | Yi | H04L 5/0048 |
| 2024/0015661 | A1* | 1/2024 | Wang | H04B 7/15528 |
| 2024/0313582 | A1* | 9/2024 | Belo | H02J 50/20 |
| 2025/0113355 | A1* | 4/2025 | Cirik | H04W 72/1273 |
| 2025/0212123 | A1* | 6/2025 | Elshafie | H04B 1/16 |
| 2025/0220639 | A1* | 7/2025 | Elshafie | H04W 72/044 |
| 2025/0280366 | A1* | 9/2025 | Leelahakriengkrai | H04W 52/243 |

FOREIGN PATENT DOCUMENTS

| | | | | |
|---|---|---|---|---|
| WO | WO-2020069164 A1 * | 4/2020 | H04B 14/328 |
| WO | WO-2023094000 A1 * | 6/2023 | H02J 7/42 |
| WO | WO-2024010696 A1 * | 1/2024 | H04B 7/15528 |

OTHER PUBLICATIONS

Clerckx et al., "Fundamentals of Wireless Information and Power Transfer: From RF Energy Harvester Models to Signal and System Designs", IEEE Journal on Selected Areas in Communications, vol. 37, No. 1, Jan. 2019, pp. 4-33.

Batres et al., "A communication architecture for wireless power transfer services based on DSRC technology", IEEE Transportation Electrification Conference and Expo (ITEC), Jun. 27-29, 2016, 8 pages.

Huang et al., "Enabling Wireless Power Transfer in Cellular Networks: Architecture, Modeling and Deployment", IEEE Transactions on Wireless Communications, vol. 13, No. 2, Feb. 2014, pp. 902-912.

Wu et al., "Generalized Wireless-Powered Communications: When to Activate Wireless Power Transfer?", IEEE Transactions on Vehicular Technology, vol. 68, No. 8, Aug. 2019, pp. 8243-8248.

Ashraf et al., "Simultaneous Wireless Information and Power Transfer With Cooperative Relaying for Next-Generation Wireless Networks: a Review", IEEE Access, vol. 9, May 10, 2021, pp. 71482-71504.

Finnish Application No. 20235100, "Wireless Power Transfer Control", filed on Feb. 3, 2023, 22 pages.

Igarashi et al., "Study of FDD downlink beamforming method suitable for WPT in real environment", International Symposium on Antennas and Propagation (ISAP), Jan. 25-28, 2021, pp. 203-204.

Office action received for corresponding European Patent Application No. 23213629.1, dated Oct. 23, 2025, 5 pages.

Extended European Search Report received for corresponding European Patent Application No. 23213629.1, dated May 31, 2024, 9 pages.

* cited by examiner

DOWNLINK POWER CONTROL FOR WIRELESS POWER TRANSFER

BACKGROUND

Field

Various example embodiments relate apparatuses to methods, systems, and/or non-transitory computer readable media for providing downlink power control for wireless power transfer.

Description of the Related Art

A 5$^{th}$ generation mobile network (5G) standard, referred to as 5G New Radio (NR), is being developed to provide higher capacity, higher reliability, and lower latency communications than the 4G long term evolution (LTE) standard.

There have been proposals to extend the 5G NR standard to accommodate energy harvesting (EH) Internet of Things (IoT) devices, EH user equipment (UE), and/or EH terminal devices. These EH IoT devices and/or EH UE devices may include, may be used with, and/or may be connected to energy harvesting (EH) devices, such as solar panels, wind turbines, heat capture devices, kinetic energy harvesting devices, back-scattering circuitry, etc., which may collect energy for storage in a power storage device (e.g., battery, etc.) included in the IoT device and/or UE devices, and in some cases may power the operation of a battery-less IoT device. Additionally, there have been proposals to provide wireless power transfer (WPT) using 5G wireless signals for EH devices capable of performing radio frequency (RF) energy harvesting.

SUMMARY

At least one example embodiment relates to a radio access network (RAN) node.

In at least one example embodiment, the RAN node may include a memory storing computer readable instructions, and processing circuitry configured to execute the computer readable instructions to cause the RAN node to, determine a wireless power transmission (WPT) control parameter associated with at least one beam and a pathloss associated with at least one user equipment (UE) device receiving the at least one beam, and transmit a WPT signal on the at least one beam based on the WPT control parameter.

Some example embodiments provide that the WPT control parameter includes at least one of: WPT transmission time domain resource information, WPT frequency domain resource information, or WPT waveform information.

Some example embodiments provide that the RAN node is further caused to, determine the WPT control parameter associated with the at least one beam based on a wireless power reception (WPR) setting associated with the at least one UE device, and the WPR setting includes at least one of, a power receiving window setting associated with at least one power receiving category, an upper bound of a power receiving window of the at least one UE device, or a lower bound of the power receiving window of the at least one UE device.

Some example embodiments provide that the RAN node is further caused to determine the WPT control parameter associated with the at least one beam by, determining a plurality of default WPR settings associated with a plurality of WPR-capable UE device types, respectively, estimating an expected pathloss of the at least one UE device receiving the at least one beam, and determining the WPT control parameter based on the determined plurality of default WPR settings and the estimated expected pathloss.

Some example embodiments provide that each of the default WPR settings of the plurality of default WPR settings includes a default power receiving window setting of the respective WPR-capable UE device type, and the RAN node is further caused to determine the WPT control parameter by, determining a lowest upper bound of power receiving windows corresponding to each of the WPR-capable UE device types among the plurality of default power receiving window settings, and determining the WPT control parameter based on the determined lowest upper bound and the estimated expected pathloss.

Some example embodiments provide that the RAN node is further caused to, receive a WPR setting associated with the at least one UE device, the received WPR setting including at least one of a power receiving window setting associated with the at least one UE device, a WPT power measurement information measured by the at least one UE device in response to the transmitted WPT signal, a WPT beam identifier associated with the transmitted WPT signal, or a power receiving time setting associated with the at least one UE device.

Some example embodiments provide that the WPR setting includes at least the power receiving window setting associated with the at least one UE device, the WPT power measurement information measured by the at least one UE device in response to the transmitted WPT signal, and the WPT beam identifier associated with the transmitted WPT signal, and the RAN node is further caused to, determine a dynamic pathloss of the at least one UE device, adjust the WPT control parameter based on the power receiving window setting of the at least one UE device and the determined dynamic pathloss, and transmit an adjusted WPT signal on the at least one beam based on the adjusted WPT control parameter.

Some example embodiments provide that the RAN node is further caused to adjust the WPT control parameter in response to changes to the dynamic pathloss of the at least one UE from UE channel changes.

At least one example embodiment relates to a user equipment (UE) device.

In at least one example embodiment, the UE device may include a memory storing computer readable instructions, and processing circuitry configured to execute the computer readable instructions to cause the UE device to, receive a wireless power transmission (WPT) control parameter associated with at least one beam from at least one radio access network (RAN) node, receive a WPT signal on the at least one beam transmitted by the at least one RAN node based on the WPT control parameter, and harvest the received WPT signal as stored energy.

Some example embodiments provide that the WPT control parameter includes at least one of, WPT transmission time domain resource information, WPT frequency domain resource information, or WPT waveform information.

Some example embodiments provide that the UE device is further caused to, transmit a wireless power reception (WPR) setting to the at least one RAN node, the WPR setting including at least one of, a power receiving window setting associated with the UE device, an upper bound of a power receiving window of the UE device, or a lower bound of the power receiving window of the UE device.

Some example embodiments provide that the UE device is further caused to, measure reference signal received power (RSRP) of the received WPT signal on the at least one beam, and transmit received WPT power measurement information to the at least one RAN node, the received WPT power measurement information including the measured RSRP of the received WPT signal and an associated WPT beam identifier.

Some example embodiments provide that the UE device is further caused to, receive an adjusted WPT signal on the at least one beam in response to the transmitted received WPT power measurement information.

Some example embodiments provide that the UE device is further caused to, transmit the received WPT power measurement information to the at least one RAN node in response to UE channel changes.

At least one example embodiment relates to a method of operating a RAN node.

In at least one example embodiment, the method may include determining a wireless power transmission (WPT) control parameter associated with at least one beam and a pathloss associated with at least one user equipment (UE) device receiving the at least one beam, and transmitting a WPT signal on the at least one beam based on the WPT control parameter.

Some example embodiments provide that the WPT control parameter includes at least one of, WPT transmission time domain resource information, WPT frequency domain resource information, or WPT waveform information, and the determining the WPT control parameter associated with the at least one beam includes determining the WPT control parameter based on a wireless power reception (WPR) setting associated with the at least one UE device, the WPR setting including at least one of, a power receiving window setting associated with at least one power receiving category, an upper bound of a power receiving window of the at least one UE device, or a lower bound of the power receiving window of the at least one UE device.

Some example embodiments provide that the determining the WPT control parameter associated with the at least one beam further includes, determining a plurality of default WPR settings associated with a plurality of WPR-capable UE device types, respectively, estimating an expected pathloss of the at least one UE device receiving the at least one beam, and determining the WPT control parameter based on the determined plurality of default WPR settings and the estimated expected pathloss.

Some example embodiments provide that each of the default WPR settings of the plurality of default WPR settings includes a default power receiving window setting of the respective WPR-capable UE device type, and the determining the WPT control parameter further includes, determining a lowest upper bound of power receiving windows corresponding to each of the WPR-capable UE device types among the plurality of default power receiving window settings, and determining the WPT control parameter based on the determined lowest upper bound and the estimated expected pathloss.

Some example embodiments provide that the method further includes receiving a WPR setting associated with the at least one UE device, the received WPR setting including at least one of a received WPT power measurement information measured by the at least one UE device in response to the transmitted WPT signal, a WPT beam identifier associated with the transmitted WPT signal, or a power receiving time setting associated with the at least one UE device.

Some example embodiments provide that the method further includes determining a dynamic pathloss of the at least one UE device, adjusting the WPT control parameter based on the power receiving window setting of the at least one UE device and the determined dynamic pathloss, and transmitting an adjusted WPT signal on the at least one beam based on the adjusted WPT control parameter.

At least one example embodiment relates to a RAN node.

In at least one example embodiment, the RAN node may include means for determining a wireless power transmission (WPT) control parameter associated with at least one beam and a pathloss associated with at least one user equipment (UE) device receiving the at least one beam, and transmitting a WPT signal on the at least one beam based on the WPT control parameter.

Some example embodiments provide that the WPT control parameter includes at least one of, WPT transmission time domain resource information, WPT frequency domain resource information, or WPT waveform information.

Some example embodiments provide that the RAN node further includes means for, determining the WPT control parameter associated with the at least one beam based on a wireless power reception (WPR) setting associated with the at least one UE device, and the WPR setting includes at least one of, a power receiving window setting associated with at least one power receiving category, an upper bound of a power receiving window of the at least one UE device, or a lower bound of the power receiving window of the at least one UE device.

Some example embodiments provide that the RAN node further includes means for, determining a plurality of default WPR settings associated with a plurality of WPR-capable UE device types, respectively, estimating an expected pathloss of the at least one UE device receiving the at least one beam, and determining the WPT control parameter based on the determined plurality of default WPR settings and the estimated expected pathloss.

Some example embodiments provide that each of the default WPR settings of the plurality of default WPR settings includes a default power receiving window setting of the respective WPR-capable UE device type, and the RAN node further includes means for, determining a lowest upper bound of power receiving windows corresponding to each of the WPR-capable UE device types among the plurality of default power receiving window settings, and determining the WPT control parameter based on the determined lowest upper bound and the estimated expected pathloss.

Some example embodiments provide that the RAN node further includes means for, receiving a WPR setting associated with the at least one UE device, the received WPR setting including at least one of a power receiving window setting associated with the at least one UE device, a WPT power measurement information measured by the at least one UE device in response to the transmitted WPT signal, a WPT beam identifier associated with the transmitted WPT signal, or a power receiving time setting associated with the at least one UE device.

Some example embodiments provide that the WPR setting includes at least the power receiving window setting associated with the at least one UE device, the WPT power measurement information measured by the at least one UE device in response to the transmitted WPT signal, and the WPT beam identifier associated with the transmitted WPT signal, and the RAN node further includes means for, determining a dynamic pathloss of the at least one UE device, adjusting the WPT control parameter based on the power receiving window setting of the at least one UE device and the determined dynamic pathloss, and transmitting an adjusted WPT signal on the at least one beam based on the adjusted WPT control parameter.

Some example embodiments provide that the RAN node further includes means for, adjusting the WPT control parameter in response to changes to the dynamic pathloss of the at least one UE from UE channel changes.

At least one example embodiment relates to a UE device.

In at least one example embodiment, the UE device may include means for, receiving a wireless power transmission (WPT) control parameter associated with at least one beam from at least one radio access network (RAN) node, receiving a WPT signal on the at least one beam transmitted by the at least one RAN node based on the WPT control parameter, and harvesting the received WPT signal as stored energy.

Some example embodiments provide that the WPT control parameter includes at least one of, WPT transmission time domain resource information, WPT frequency domain resource information, or WPT waveform information.

Some example embodiments provide that the UE device may include means for, transmitting a wireless power reception (WPR) setting to the at least one RAN node, the WPR setting including at least one of, a power receiving window setting associated with the UE device, an upper bound of a power receiving window of the UE device, or a lower bound of the power receiving window of the UE device.

Some example embodiments provide that the UE device may include means for, measuring reference signal received power (RSRP) of the received WPT signal on the at least one beam, and transmitting received WPT power measurement information to the at least one RAN node, the received WPT power measurement information including the measured RSRP of the received WPT signal and an associated WPT beam identifier.

Some example embodiments provide that the UE device may include means for, receiving an adjusted WPT signal on the at least one beam in response to the transmitted received WPT power measurement information.

Some example embodiments provide that the UE device may include means for, transmitting the received WPT power measurement information to the at least one RAN node in response to UE channel changes.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1A:
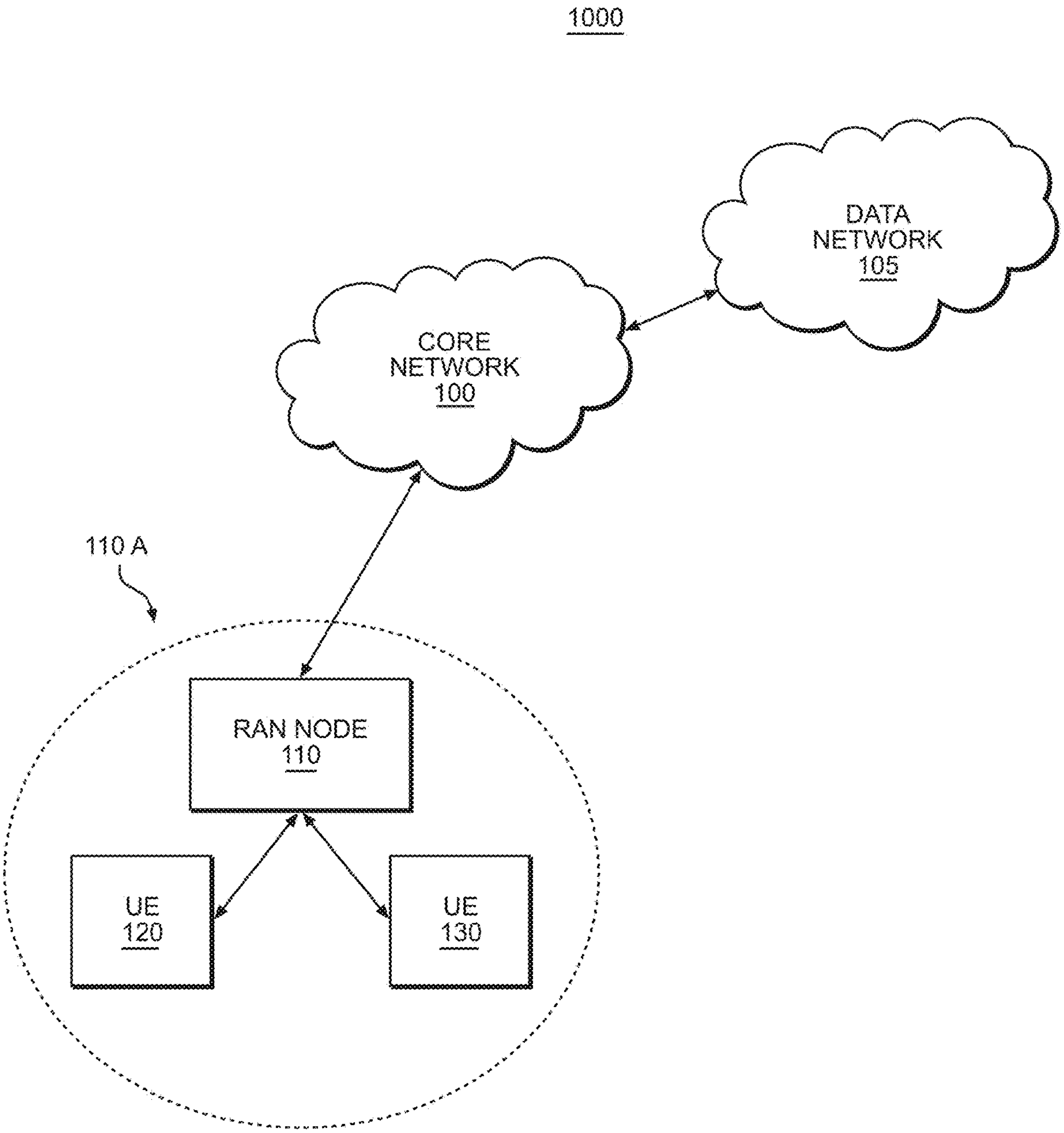
FIG. 1A illustrates an example wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the example embodiments. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of the example embodiments. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware circuitry and/or software, firmware, middleware, microcode, hardware description languages, etc., in combination with hardware (e.g., software executed by hardware, etc.). When implemented in software, firmware, middleware or microcode, the program code or code segments to perform the desired tasks may be stored in a machine or computer readable medium such as a non-transitory computer storage medium, and loaded onto one or more processors to perform the desired tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the term "circuitry" and/or "hardware circuitry" may refer to one or more or all of the following: (a) hardware-only circuit implementation (such as implementations in only analog and/or digital circuitry); (b) combinations of hardware circuits and software, such as (as applicable): (i) a combination of analog and/or digital hardware circuit(s) with software/firmware, and (ii) any portions of hardware processor(s) with software (including digital signal processor(s)), software, and memory(ies) that work together to cause an apparatus, such as a mobile phone or server, to perform various functions); and (c) hardware circuit(s) and/or processor(s), such as microprocessor(s) or a portion of a microprocessor(s), that requires software (e.g., firmware) for operation, but the software may not be present when it is not needed for operation. For example, the circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

While the various example embodiments of the present disclosure are discussed in connection with the 5G wireless communication standard for the sake of clarity and convenience, the example embodiments are not limited thereto, and one of ordinary skill in the art would recognize the example embodiments may be applicable to other wireless communication standards, such as the 4G standard, a Wi-Fi standard, a future 6G standard, a future 7G standard, etc.

Figure 1B:
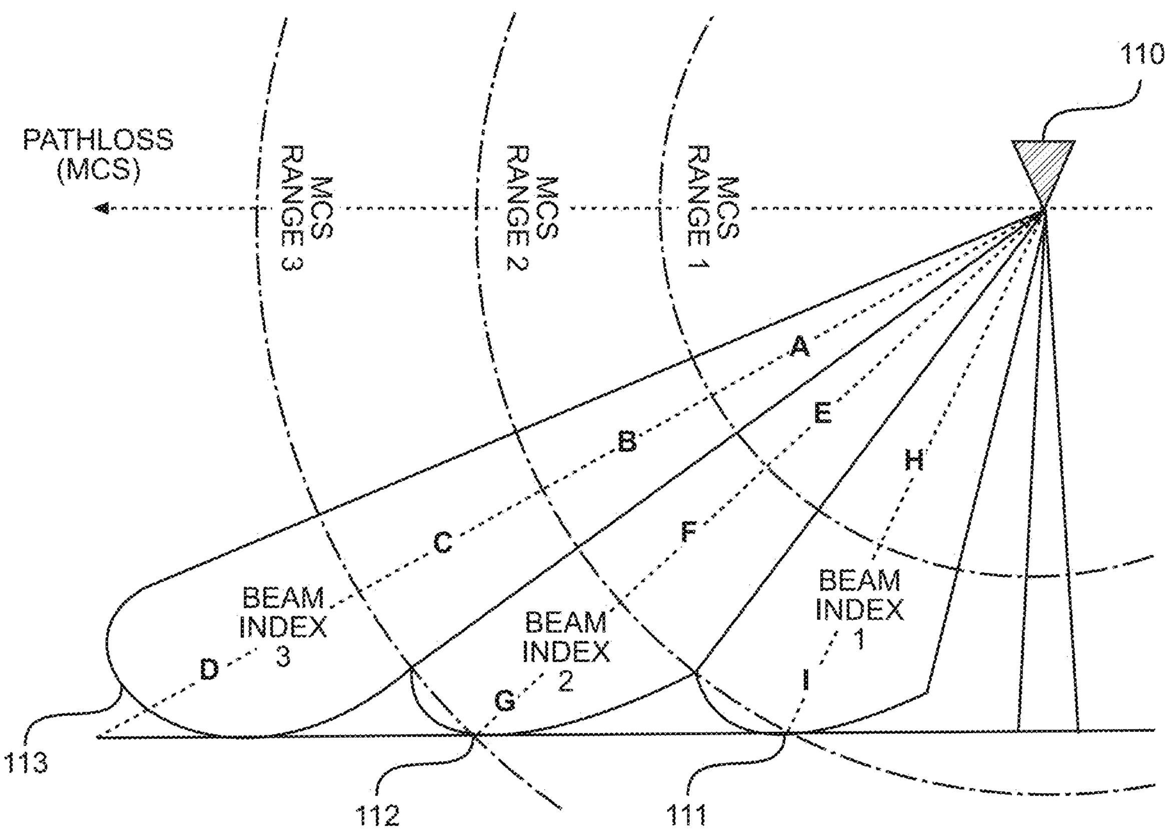
FIG. 1B illustrates an example beam grid power configuration according to at least one example embodiment.

FIG. 1A illustrates an example wireless communication system according to at least one example embodiment. FIG. 1B illustrates an example beam grid power configuration according to at least one example embodiment.

Various example embodiments are directed towards downlink (DL) power control for wireless power transfer. More specifically, at least one example embodiment provides a method of providing DL power control and/or allocation scheme for wireless power transfer using a wireless network, a wireless network system implementing the DL power control scheme, a RAN node capable of providing WPT signals and/or a UE device capable of performing radio frequency to direct current (RF-to-DC) energy harvesting of the WPT signals, etc.

Conventional RF energy harvesting techniques assume a monotonic function (e.g., a linear relationship) between the demodulation performance and the received power of the RF harvesting device, wherein the larger the amount of RF power received by the RF harvesting device results in the larger amount of DC energy the RF harvesting device generates. However, studies have shown that the power conversion efficiency of RF-to-DC devices are not a monotonic function on the received RF power, and instead there is an upper limit on the power conversion (e.g., a voltage reverse breakdown region), wherein any RF power received after the voltage reverse breakdown region is reached results in a sharp decrease in the power conversion efficiency. The voltage reverse breakdown region may also be referred to as the diode breakdown region of the RF-to-DC EH device (hereinafter referred to as EH device) and/or a saturation point of the EH device, which may lead to overheating and/or deterioration of the EH device, etc., and/or results in increased waste of wireless resources, unnecessary energy consumption, etc.

Accordingly, there is a desire to provide improved and/or more efficient methods for DL power control for wireless power transfer, etc. According to at least one example embodiment, a RAN node may provide more efficient and/or optimized wireless power transfer (WPT) waveforms (e.g., signals, etc.) which are determined based on the EH capabilities of the UE devices which are connected to the RAN node, etc. Additionally, according to some example embodiments, the RAN node may provide WPT waveforms on separate frequency domain resources and/or time domain resources (e.g., dedicated WPT wireless network resources, etc.), so that the EH UE device may switch from a data transmission (TX)/reception (RX) mode and/or a measurement mode to a EH mode during TX/RX idle times, etc., thereby reducing and/or eliminating radio interference between WPT waveforms and data waveforms, etc. Further, some example embodiments are directed to a RAN node which provides a power transfer scheduling gap and/or power transfer slot for EH UE devices, etc. Moreover, one or more example embodiments provide for a dynamic method of DL power control, wherein the DL power control may be updated and/or adjusted based on UE mobility (e.g., changes in UE location, etc.). However, the example embodiments are not limited thereto, and other advantages and/or benefits may be provided by the example embodiments discussed herein.

As shown in FIG. 1A, a wireless communication system 1000 includes a core network 100, a Data Network 105, a radio access network (RAN) node 110, a first RF-to-DC EH user equipment device (e.g., a UE device, UE, terminal device, etc.) 120, a second RF-to-DC EH UE device 130, etc., but the example embodiments are not limited thereto, and for example, may include a greater or lesser number of constituent elements. For example, the wireless communication system may include two or more RAN nodes, one UE or three or more UEs, additional base stations, servers, routers, access points, gateways, etc.

The RAN node 110, and/or the UEs 120, 130 may be connected over a wireless network, such as a cellular wireless access network (e.g., a 3G wireless access network, a 4G-Long Term Evolution (LTE) network, a 5G-New Radio (e.g., 5G) wireless network, a 6G wireless network, a WiFi network, etc.). The wireless network may include a core network 100 and/or a Data Network 105. The RAN node 110 may connect to other RAN nodes (not shown), as well as to the core network 100 and/or the Data Network 105, over a wired and/or wireless network. The core network 100 and the Data Network 105 may connect to each other over a wired and/or wireless network. The Data Network 105 may refer to the Internet, an intranet, a wide area network, etc.

According to some example embodiments, the RAN node 110 may act as a relay node (e.g., an integrated access and backhaul (IAB) node) and may communicate with the UEs 120, 130, etc., in combination with at least one base station (and/or access point (AP), router, etc.) (not shown) of the same or a different radio access technology (e.g., WiFi, etc.).

The UEs 120, 130 may be configurable to transmit and/or receive data in accordance to strict latency, reliability, and/or accuracy requirements, such as ultra-reliable low latency communications (URLLC), time sensitive communications (TSC), etc., but the example embodiments are not limited thereto.

According to at least one example embodiment, the UEs 120, 130, etc., may be energy harvesting UE devices, (e.g., a EH reduced capability (REDCAP) UE device, a EH IoT device, a EH terminal device, etc.), and may be configured to harvest energy using EH circuitry (e.g., EH devices, EH apparatuses, and/or EH means, etc.), such as solar cells/panels, wind turbines, water turbines, heat pumps, geothermal heat pumps, kinetic energy harvesting devices and/or vibration harvesting devices, radio frequency (RF) harvesting devices (e.g., back-scattering circuitry configured to energy harvest RF signals transmitted by RF sources, etc.), but the example embodiments are not limited thereto. More particularly, according to some example embodiments, the UEs 120, 130, etc., may be RF EH devices and may harvest energy from a WPT signal (e.g., WPT waveform, WPT beam, etc.), communication signal, control signal, or reference signal transmitted by the RAN node 110, etc., but the example embodiments are not limited thereto.

According to some example embodiments, the UEs 120, 130, etc., may be a smartphone, a tablet, a desktop computer, a laptop computer, a wearable device, an Internet of Things (IoT) device, a wireless tag, a sensor (e.g., thermometers, humidity sensors, pressure sensors, motion sensors, accelerometers, flood sensors, seismic sensors, etc.), monitoring/tracking sensors (e.g., machine status, parking meter data, vending machine inventory, etc.), utility meters, static and/or mobile asset tracking devices (e.g., for use in industrial and/or warehouse environments, etc.) medical devices, actuators, robotic devices, other forms of robotics, drones, connected medical devices, eHealth devices, smart city related devices, smart grid devices, security cameras, autonomous devices (e.g., autonomous unmanned aerial vehicles, etc.), and/or any other type of stationary or portable device capable of operating according to, for example, the 5G NR communication standard, and/or other wireless communication standard(s).

According to at least one example embodiment, the UEs 120, 130, etc., may harvest (e.g., obtain, collect, etc.) energy from the at least one EH harvesting circuitry included in, connected to, and/or attached to the UE device, and the UEs 120, 130, etc., may store the harvested energy in at least one energy storage device (e.g., a battery, a capacitor, etc.) included in, connected to, and/or associated with the UEs 120, 130, etc., but the example embodiments are not limited thereto. Additionally, according to some example embodiments, the UEs 120 and/or 130, may omit the energy storage device, and may be powered directly by the energy collected by the EH harvesting device, etc.

The wireless communication system further includes a plurality of transmission/reception points (TRPs) (e.g., a base station, a wireless access point, etc.), such as RAN node 110, etc. The RAN node 110 may operate according to an underlying cellular and/or wireless radio access technology (RAT), such as 5G NR, LTE, Wi-Fi, etc. For example, the RAN node 110 may be a 5G gNB node, a LTE eNB node, or a LTE ng-eNB node, etc., but the example embodiments are not limited thereto. The RAN node 110 may provide wireless network services to one or more UE devices within one or more cells (e.g., cell service areas, broadcast areas, serving areas, coverage areas, etc.) surrounding the respective physical location of the RAN node. As shown in FIG. 1A, the RAN node 110 may provide cell 110A, but the example embodiments are not limited thereto.

Additionally, the RAN node 110 may be configured to operate in a multi-user (MU) multiple input multiple out (MIMO) mode and/or a massive MIMO (mMIMO) mode, wherein the RAN node 110 transmits a plurality of beams (e.g., radio channels, datastreams, streams, etc.) in different spatial domains and/or frequency domains using a plurality of antennas (e.g., antenna panels, antenna elements, an antenna array, etc.) and beamforming and/or beamsteering techniques. For example, RAN node 110 may transmit and/or receive transmissions using two or more beams, but the example embodiments are not limited thereto, and for example, the RAN node may transmit using a greater or lesser number of beams, etc.

Additionally, the UEs 120, 130, etc., may be located within the cell service areas 110A, and may connect to, receive broadcast messages from, receive paging messages from, receive/transmit signaling messages from/to, and/or access the wireless network through, etc., from the RAN node 110. However, the example embodiments are not limited thereto, and for example, one or more of the UEs may connect to two or more RAN nodes and may perform carrier aggregation using one or more component carriers (CCs) from one or more of the RAN nodes, etc.

According to at least one example embodiment, the UEs 120, 130, etc., may include multiple antenna panels (e.g., may be a multi-panel UE device, etc.), and may transmit and/or receive to a plurality of RAN nodes (e.g., TRPs), etc., using the same time-frequency resources and/or using resources overlapping in time, but the example embodiments are not limited thereto.

Referring now to FIG. 1B, according to at least one example embodiment, the RAN node 110 may transmit WPT waveforms (e.g., WPT signals, WPT waveforms, etc.) using one or more beams. As shown in FIG. 1B, the RAN node 110 may transmit a first WPT beam 111, a second WPT beam 112, and/or a third WPT beam 113, etc., but the example embodiments are not limited thereto, and for example, the RAN node 110 may transmit a lesser or greater number of WPT beams, etc. Each of the WPT beams 111 to 113, etc., may be transmitted using different TX power and/or frequency ranges, but the example embodiments are not limited thereto, and for example, two or more of the beams may have the same TX power and/or same frequency ranges, etc. Additionally, the RAN node 110 may further transmit data on data beams (not shown), and/or the RAN node 110 may alternate between transmitting WPT waveforms on the beams 111, 112, and/or 113, and transmitting data on the beams 111, 112, and/or 113, etc. Assuming that the beams 111 to 113 are dedicated WPT beams, each of the WPT beams 111 to 113 may include a beam index, e.g., beam index 1 to 3, respectively, and may be sub-divided into a plurality of sectors based on modulation and coding scheme (MCS) ranges and/or received power (e.g., Reference Signal Received Power) ranges, e.g., beam 111 may be sub-divided into sectors H and I, beam 112 may be sub-divided into sectors E, F, and G, and beam 113 may be sub-divided by sectors A, B, C, and D, etc. As shown in FIG. 1B, the plurality of sectors of each individual beams correspond to different average MCS values for the desired sector, wherein the MCS value is based on and/or is affected by the distance of the sector from the transmitter of the RAN node 110. In other words, the expected pathloss for potential UEs residing within different beams will be different, and likewise, the expected pathloss for potential UEs residing within the same beam may be different based on the sector of the beam that the UE is residing within. Therefore, the power control parameter(s) for each of the different beams and/or each of the different sectors may be different, and should be separately and/or individually calculated, etc.

According to at least one example embodiment, the RAN node 110 may be connected to at least one core network element (not shown) residing on the core network 100, such as a core network device, a core network server, access points, switches, routers, nodes, etc., but the example embodiments are not limited thereto. The core network 100 may provide network functions, such as an access and mobility management function (AMF), a session management function (SMF), a policy control function (PCF), a unified data management (UDM), a user plane function (UPF), an authentication server function (AUSF), an application function (AF), and/or a network slice selection function (NSSF), etc., and/or equivalent functions, but the example embodiments are not limited thereto.

While certain components of a wireless communication network are shown as part of the wireless communication system of FIG. 1A, the example embodiments are not limited thereto, and the wireless communication network may include components other than that shown in FIG. 1A, which are desired, necessary, and/or beneficial for operation of the underlying networks within the wireless communication system, such as access points, switches, routers, nodes, servers, gateways, etc.

Figure 2:
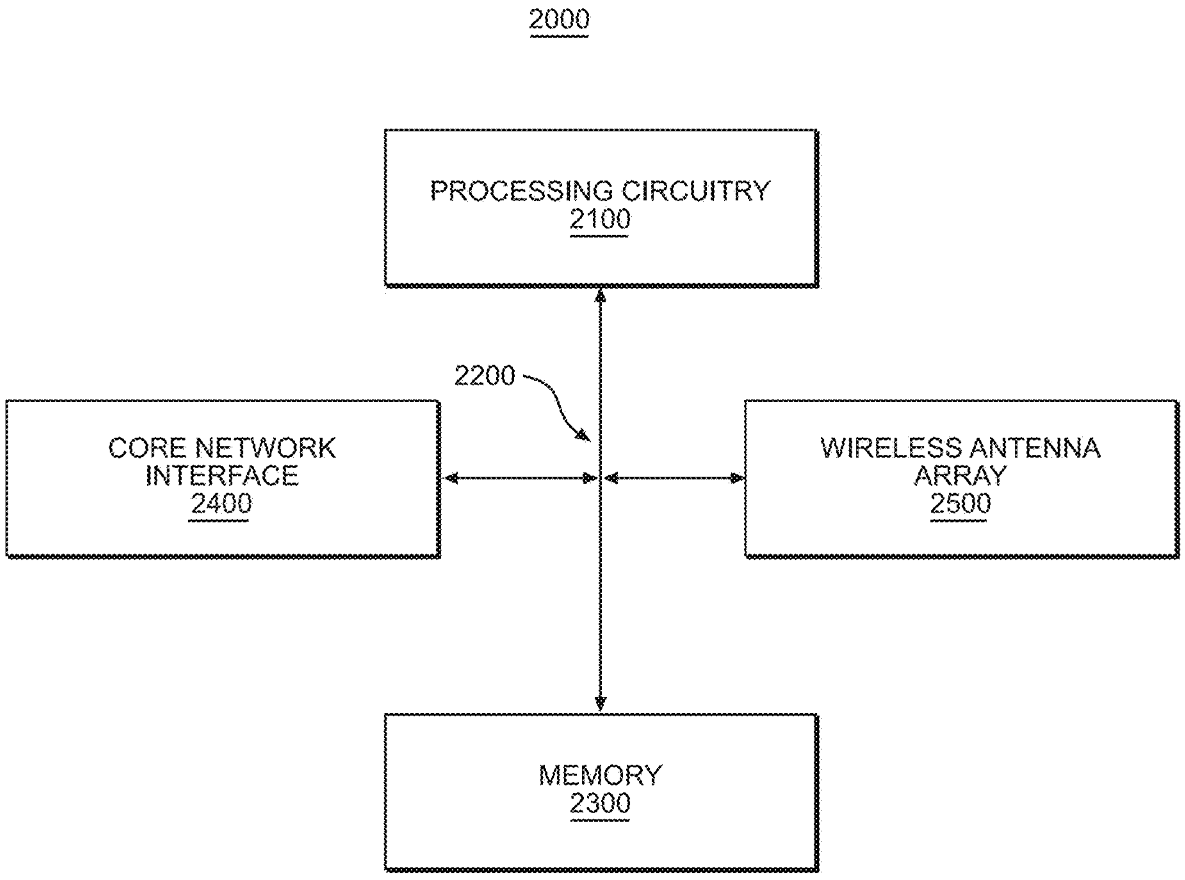
FIG. 2 illustrates a block diagram of an example RAN node according to at least one example embodiment.

FIG. 2 illustrates a block diagram of an example RAN node according to at least one example embodiment. The RAN node of FIG. 2 may correspond to the RAN node 110, but the example embodiments are not limited thereto.

Referring to FIG. 2, a RAN node 2000 may include processing circuitry, such as processing circuitry 2100, at least one communication bus 2200, a memory 2300, at least one core network interface 2400 (e.g., a private network interface, etc.), at least one wireless antenna array 2500, etc., but the example embodiments are not limited thereto. For example, the core network interface 2400 and the wireless antenna array 2500 may be combined into a single network interface, etc., or the RAN node 2000 may include a plurality of wireless antenna arrays, a plurality of core network interfaces, etc., and/or any combinations thereof. The memory 2300 may include various special purpose program code including computer executable instructions for performing the operations of FIG. 4, etc., which may cause the RAN node 2000 to perform the one or more of the methods of the example embodiments, but the example embodiments are not limited thereto.

In at least one example embodiment, the processing circuitry 2100 may include at least one processor (and/or processor cores, distributed processors, networked processors, application processors, etc.), which may be configured to control one or more elements of the RAN node 2000, and thereby cause the RAN node 2000 to perform various operations. The processing circuitry 2100 is configured to execute processes by retrieving program code (e.g., computer readable instructions) and data from the memory 2300 to process them, thereby executing special purpose control and functions of the entire RAN node 2000. Once the special purpose program instructions are loaded into the processing circuitry 2100, the processing circuitry 2100 executes the special purpose program instructions, thereby transforming the processing circuitry 2100 into a special purpose processor. According to some example embodiments, the processing circuitry 2100 may include a specially programmed FPGA, a special purpose system-on-chip (SoC), a special purpose ASIC, etc., which is specifically provided to perform the functionality related to the method of FIG. 4, etc., but the example embodiments are not limited thereto.

In at least one example embodiment, the memory 2300 may be a non-transitory computer-readable storage medium and may include a random access memory (RAM), a read only memory (ROM), and/or a permanent mass storage device such as a disk drive, or a solid state drive. Stored in the memory 2300 is program code (i.e., computer readable instructions) related to operating the RAN node 2000, such as the method discussed in connection with FIG. 4, the at least one core network interface 2400, the at least one wireless antenna array 2500, the scheduler 115, and/or the controller 101, etc. Such software elements may be loaded from a non-transitory computer-readable storage medium independent of the memory 2300, using a drive mechanism (not shown) connected to the RAN node 2000, or via the at least one core network interface 2400, and/or at least one wireless antenna array 2500, etc.

In at least one example embodiment, the communication bus 2200 may enable communication and data transmission to be performed between elements of the RAN node 2000. The bus 2200 may be implemented using a high-speed serial bus, a parallel bus, and/or any other appropriate communication technology. According to at least one example embodiment, the RAN node 2000 may include a plurality of communication buses (not shown), such as an address bus, a data bus, etc.

Additionally, according to some example embodiments, the RAN node 2000 may also operate as a RAN node, for example, a 4G RAN node, a 5G RAN node, a WiFi node, etc., for any UE devices and/or UEs within wireless range of the network node, but the example embodiments are not limited thereto.

The RAN node 2000 may also include at least one core network interface 2400, and/or at least one wireless antenna array 2500, etc. The at least one wireless antenna array 2500 may include an associated array of radio units (not shown) and may be used to transmit the wireless signals in accordance with a radio access technology, such as 4G LTE wireless signals, 5G NR wireless signals, RFID wireless signals, Bluetooth wireless signals, WiFi wireless signals, etc., to at least one UE device, such as UEs 120, 130, etc. According to some example embodiments, the wireless antenna array 2500 may be a single antenna, or may be a plurality of antennas, etc. For example, the wireless antenna array 2500 may be configured as a grid of beams (GoB) which transmits a plurality of beams in different directions, angles, frequencies, and/or with different delays, etc., but the example embodiments are not limited thereto.

The RAN node 2000 may communicate with a core network (e.g., a backend network, backhaul network, backbone network, a private network, a local area network (LAN), a WAN, Data Network, etc.) via the core network interface 2400. The core network interface 2400 may be a wired and/or wireless network interface and may enable the RAN node 2000 to communicate and/or transmit data to and/or from network devices on the backend network, such as a neighboring RAN nodes (not shown), a core network gateway (not shown), a Data Network, such as the Internet, intranets, WANs, LANs, etc. 89 While FIG. 2 depicts an example embodiment of a RAN node 2000, the RAN nodes are not limited thereto, and may include additional and/or alternative architectures that may be suitable for the purposes demonstrated.

Figure 3:
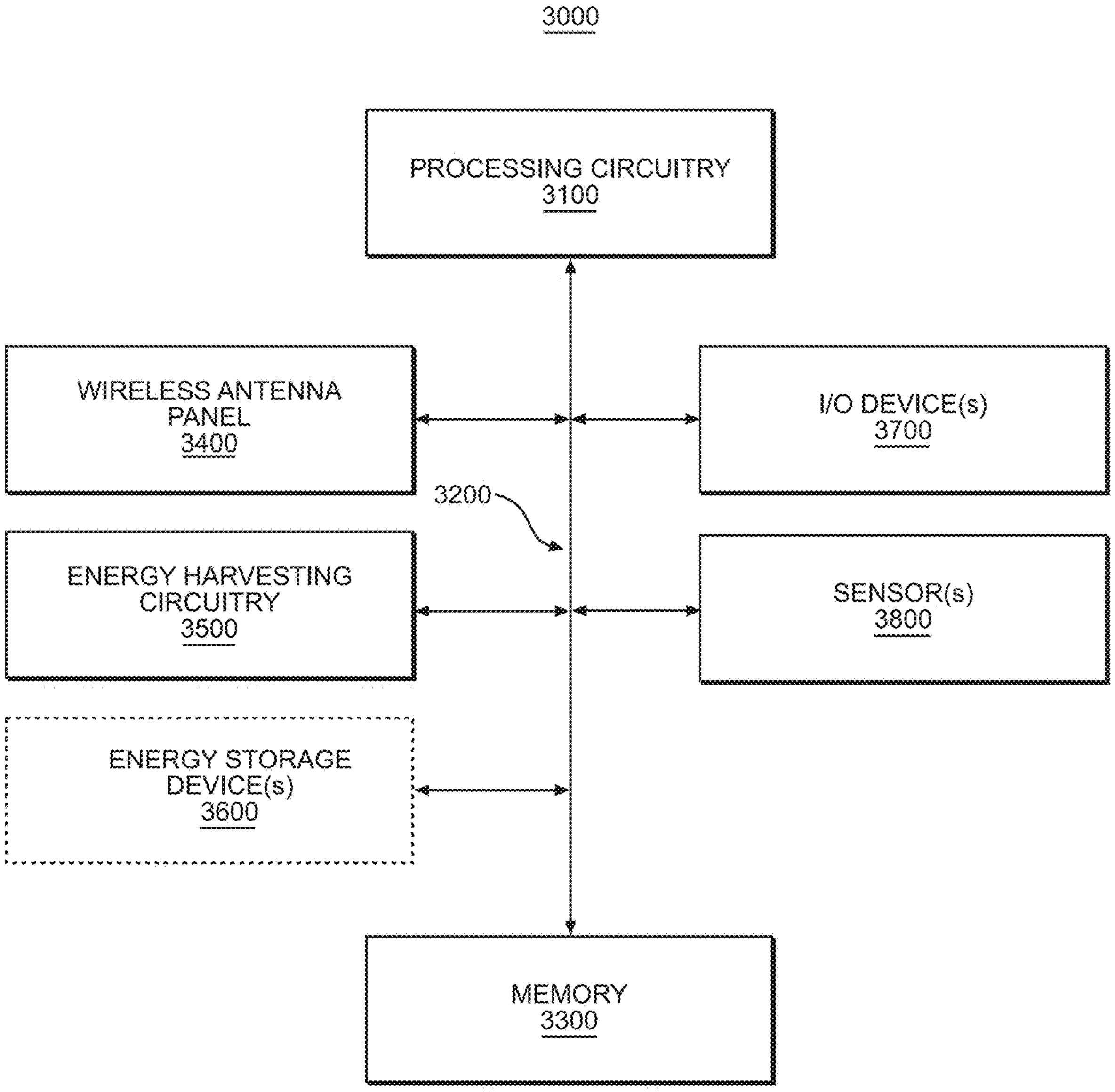
FIG. 3 illustrates a block diagram of an example UE device according to at least one example embodiment.

FIG. 3 illustrates a block diagram of an example RF EH UE device according to at least one example embodiment. The example UE device 3000 of FIG. 3 may correspond to one or more of the UEs 120, 130 of FIG. 1A, but the example embodiments are not limited thereto, and the UEs may employ alternative architectures, etc.

Referring to FIG. 3, a UE device 3000 (e.g., a smartphone, a IoT device, a robot, an industrial sensor, an automated ground vehicle (AGV), an unmanned aerial vehicle (UAV), etc.) may include processing circuitry 3100, at least one communication bus 3200, a memory 3300, a plurality of wireless antennas and/or wireless antenna panels 3400, at least one input/output (I/O) device 3700 (e.g., a microphone, a camera, a speaker, etc.), and/or at least one sensor 3800 (e.g., a motion sensor, a thermal sensor, a humidity sensor, a seismic sensor, etc.), but the example embodiments are not limited thereto. According to some example embodiments, the UE device 3000 may include a greater or lesser number of constituent components, and for example, the UE device 3000 may also include at least one radio frequency (RF) harvesting circuitry (e.g., back-scattering circuitry, etc.), one or more solar cells/panels, wind turbines, water turbines, heat pumps, geothermal heat pumps, kinetic energy harvesting devices and/or vibration harvesting devices, etc., and/or at least one energy storage device 3600 (e.g., a battery, a capacitor, etc.), but the example embodiments are not limited thereto. For example, in at least one example embodiment, the energy storage device 3600 may be omitted, and the energy collected by the energy harvesting circuitry 3500 may be used to directly power the UE device 3000, etc.

According to some example embodiments, the UE device 3000 may include at least one RF harvesting circuitry capable of collecting energy from transmitted and/or broadcast 5G RF signals, e.g., RF signals transmitted from the RAN node 110, etc., as well as from ambient RF sources which do not use the same RAT as the UE device 3000 and/or RF signals transmitted on a different RF channel, but the example embodiments are not limited thereto. According to at least one example embodiment, assuming that the UE device 3000 is configured to operate according to the 5G NR standard, the UE device 3000 may collect energy from the RF signals transmitted from the RAN node 110, etc., and may collect ambient RF energy from RF signals transmitted by television broadcast towers, radio broadcast towers, satellites, WiFi access points, Bluetooth access points, etc., but the example embodiments are not limited thereto. Additionally, the UE device 3000 may further include one or more proximity sensors 3800, such as one or more proximity sensors (e.g., an infra-red proximity sensor, a capacitive proximity sensor, etc.), one or more location sensors (e.g., GPS, GLONASS, Beidou, Galileo, etc.), other sensors (e.g., thermometers, humidity sensors, pressure sensors, motion sensors, accelerometers, etc.), actuators, a single wireless antenna and/or a single wireless antenna panel, etc. Additionally, the sensor 3800, and/or I/O device 3700, etc., of the UE device 3000 may be optional.

In at least one example embodiment, the processing circuitry 3100 may include at least one processor (and/or processor cores, distributed processors, networked processors, etc.), such as the at least one processor, which may be configured to control one or more elements of the UE device 3000, and thereby cause the UE device 3000 to perform various operations. The processing circuitry 3100 is configured to execute processes by retrieving program code (e.g., computer readable instructions) and data from the memory 3300 to process them, thereby executing special purpose control and functions of the entire UE device 3000. Once the special purpose program instructions are loaded into the processing circuitry 3100 (e.g., the at least one processor, etc.), the processing circuitry 3100 executes the special purpose program instructions, thereby transforming the processing circuitry 3100 into a special purpose processor.

In at least one example embodiment, the memory 3300 may be a non-transitory computer-readable storage medium and may include a random access memory (RAM), a read only memory (ROM), and/or a permanent mass storage device such as a disk drive, or a solid state drive. Stored in the memory 3300 is program code (i.e., computer readable instructions) related to operation of the UE device 3000, such as the methods discussed in connection with FIG. 4, etc. Such software elements may be loaded from a non-transitory computer-readable storage medium independent of the memory 3300, using a drive mechanism (not shown) connected to the UE device 3000, or via the wireless antenna 3400, etc. Additionally, the memory 3300 may store network configuration information, such as system information, resource block scheduling, etc., for communicating with at least one RAN node associated with the core network 100, accessing a wireless network, etc., but the example embodiments are not limited thereto. According to some example embodiments, the memory 3300 may also store EH capability information associated with the UE device 3000, such as the wireless power receiving (WPR) window (e.g., WPR range, etc.), the wireless power receiving category (e.g., EH high category, EH medium category, EH low category, EH none category (e.g., the UE device is not capable of energy harvesting, etc.)), an upper bound of the UE device 3000's WPR window, a lower bound of the UE device 3000's WPR window, etc., but the example embodiments are not limited thereto.

In at least one example embodiment, the at least one communication bus 3200 may enable communication and data transmission/reception to be performed between elements of the UE device 3000, and/or monitor the status of the elements of the UE device 3000 (e.g., monitor the current energy storage level of the energy storage device 3600, monitor the current amount of energy being collected, monitor whether the energy harvesting device 3500 is currently active (e.g., harvesting and/or collecting energy) or currently inactive (e.g., not collecting energy), etc. The bus 3200 may be implemented using a high-speed serial bus, a parallel bus, and/or any other appropriate communication technology. According to at least one example embodiment, the UE device 3000 may include a plurality of communication buses (not shown), such as an address bus, a data bus, etc.

The UE device 3000 may also include at least one wireless antenna panel 3400, but is not limited thereto. The at least one wireless antenna panel 3400 may include at least one associated radio unit (not shown) and may be used to transmit wireless signals in accordance with at least one desired radio access technology, such as 4G LTE, 5G NR, Wi-Fi, etc. Additionally, the at least one wireless antenna panel 3400 may be configured to transmit and/or receive data communications, etc., but the example embodiments are not limited thereto. The at least one wireless antenna panel 3400 may be located at the same or different physical locations on the body of the UE device 3000, may have the same or different orientations, may operate in the same or different frequency ranges, may operate in accordance with the same or different radio access technology, etc. According to some example embodiments, the at least one wireless antenna panel 3400 may be a single antenna, or may be a plurality of antennas, etc. Additionally, the at least one wireless antenna panel 3400 may be used to collect energy from RF signals, etc.

While FIG. 3 depicts an example embodiment of a UE device 3000, the example embodiments are not limited thereto, and they may include additional and/or alternative UE architectures that may be suitable for the purposes demonstrated.

Figure 4:
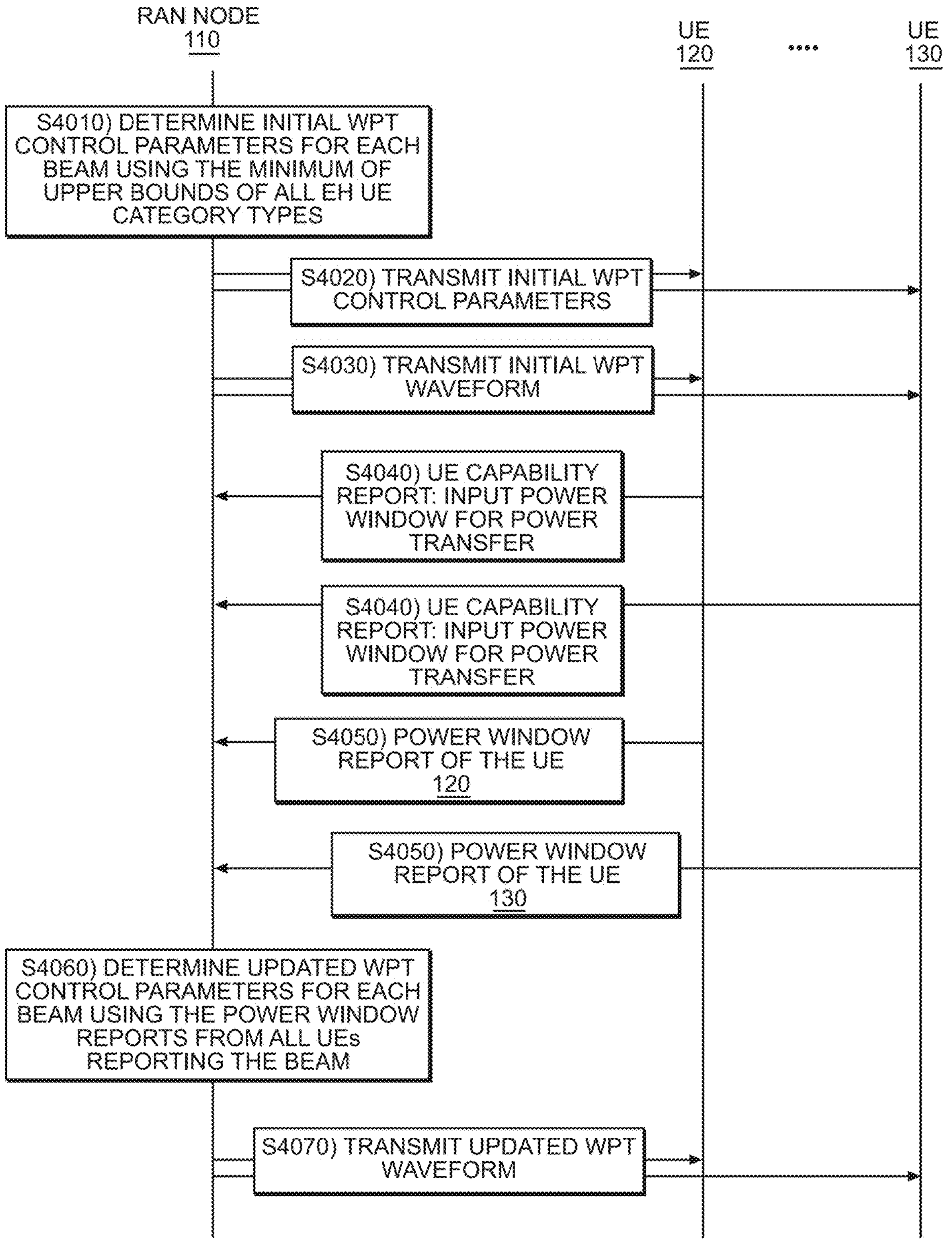
FIG. 4 illustrates an example transmission flow diagram according to at least one example embodiment.

FIG. 4 illustrates an example transmission flow diagram according to at least one example embodiment. While FIG. 4 shows a single RAN node and two UE devices, the example embodiments are not limited thereto, and for example, there may be a greater number of RAN nodes and/or a greater or lesser number of UE devices, etc.

According to at least one example embodiment, in operation S4010, a RAN node, such as RAN node 110 of FIG. 1A, may determine at least one initial WPT control parameter (e.g., WPT control setting, etc.) associated with an initial WPT signal and/or WPT waveform, etc. For example, the RAN node 110 may determine at least one standard and/or default WPR setting associated with different categories and/or types of RF EH UE devices supported by the wireless network and/or the RAN node 110, etc., such as whether high, medium, and/or low category RF EH UE devices are supported by the RAN node 110 and/or the wireless network, the WPR window (e.g., WPR range) supported by the RAN node 110, an upper bound (e.g., a first bound, a highest limit, a maximum limit, etc.) of the WPR window supported by the RAN node 110, a lower bound (e.g., a second bound, a lowest limit, a minimum limit, etc.) of the WPR window supported by the RAN node 110, an initial (e.g., default and/or standard, etc.) frequency domain resource to be used to transmit the wireless power, an initial (e.g., default and/or standard, etc.) time domain resource to be used to transmit the wireless power, an initial (e.g., default and/or standard, etc.) WPT scheduling information (e.g., the scheduling of a power transmission gap, etc.), initial WPT waveform information, etc., but the example embodiments are not limited thereto.

According to at least one example embodiment, the RF EH UE device type categories may be classified based on the peak data rates of the UE devices, power harvesting efficiencies of the UE devices, and/or rates of energy harvesting of the UE devices, but the example embodiments are not limited thereto. Additionally, while high, medium, low, and none categories are mentioned herein, the example embodiments are not limited thereto, and there may be a greater or lesser number of categories/classifications, etc.

Moreover, the RAN node 110 may obtain one or more of the WPR settings from a lookup table stored in the memory of the RAN node 110 (e.g., memory 2300 of FIG. 2) and/or from the core network 100, etc., but is not limited thereto. Additionally, these values may be standardized as part of the relevant radio access technology (RAT) (e.g., the high, medium, and/or low categories may be defined in the 5G NR protocol, in the 6G protocol, in the WiFi protocol, etc.), but the example embodiments are not limited thereto.

In operation S4020, the RAN node 110 may transmit and/or broadcast the initial WPT control parameter(s) to UE devices, such as UE devices 120 and 130, etc., in the RAN node 110 cell coverage area, etc. In operation S4030, the RAN node 110 may transmit the initial WPT waveform based on the initial WPR control parameter(s). More particularly, the RAN node 110 may determine the lowest upper bound among the plurality of upper bounds associated with the plurality of UE device categories supported by the RAN node 110, etc. For example, assuming that the RF EH UE device types are categorized based on the power harvesting efficiencies of the UE devices, if the RAN node 110 supports only the high (e.g., $X_1$ dB to $X_2$ dB of received power, where $X_1>X_2$) and medium (e.g., $Y_1$ dB to $Y_2$ dB of received power, where $Y_1>Y_2$ and $X_1>Y_1$) RF EH categories, the RAN node 110 may set the lowest upper bound value as being the upper bound associated with the medium category (e.g., $Y_1$ dB), etc., because all of the RF EH UE devices supported by the RAN node 110 would be capable of receiving the upper bound associated with the lowest supported category, but the example embodiments are not limited thereto, and for example, the RAN node 110 may be configured to and/or controlled to use an arbitrary and/or configured value as the equivalent of the upper bound value, etc. Additionally, the RAN node 110 may estimate the expected pathloss to UE devices served by each of the WPT beams within the RAN node 110's cell service area using the following equation.

$$PL_{exp} = \left( \frac{c}{4\pi \cdot \frac{h}{\cos(\theta)} \cdot f} \right)^2 \quad \text{[Equation 1]}$$

Where c=the speed of light; f=the carrier frequency; θ=the vertical angle of the specified WPT beam; and h=the height of the transmission antenna of the RAN node 110. Additionally, this equation assumes the horizontal angle of the beam is 0, but the example embodiments are not limited thereto.

RAN node 110 may then calculate the WPT waveform (e.g., WPT transmission power, WPT frequency domain resources, WPT time domain resources, etc.) based on the determined lowest upper bound and the estimated pathloss associated with each WPT beam. By using the determined lowest upper bound, the RAN node 110 ensures that the RF EH UE devices will not become oversaturated due to receiving WPT which exceeds the voltage reverse breakdown region of the RF EH UE device, etc., and also reduces and/or minimizes the potential wasted energy being transmitted by the RAN node 110, etc.

In operation S4040, the UE devices 120 and/or 130, etc., may transmit messages to the RAN node 110 indicating their respective energy harvesting capabilities, etc. For example, the UE devices 120 and 130 may transmit information indicating whether it supports or does not support RF energy harvesting, etc., but the example embodiments are not limited thereto. According to at least one example embodiment, the UE devices 120 and/or 130 may report their respective energy harvesting capabilities during radio resource control (RRC) setup stage, but the example embodiments are not limited thereto. According to at least one example embodiment, operation S4040 may be omitted, and the energy harvesting capabilities may be implicitly derived from and/or included in the UE's transmission of a receiving power window report in S4050, etc.

In operation S4050, the UE devices 120 and/or 130, etc., may also transmit a power receiving window report indicating at least one WPR setting of the UE device, respectively. For example, the WPR settings may include information indicating the power receiving window category setting of the UE device, information indicating the upper bound of the power receiving window of the UE device, information indicating the lower bound of the power receiving window, etc., but the example embodiments are not limited thereto.

Additionally, the UE devices 120 and/or 130 may measure and/or determine the reference signal received power (RSRP) for each WPR waveform (e.g., WPR signals, etc.) received by the UE devices 120 and/or 130, respectively, but is not limited thereto, and for example, may measure other metrics such as the received signal strength indicator (RSSI), reference signal received quality (RSRQ), signal-to-noise and interference ratio (SINR), etc., of the WPR waveforms, etc. The UE devices 120 and/or 130 may then transmit the measured RSRP and/or other signal quality measurement values for each WPR beam to the RAN node 110, but are not limited thereto. For example, the UE devices 120 and/or 130 may transmit the measured RSRP values in a channel state information (CSI) report to the RAN node 110, but are not limited thereto.

In operation S4060, the RAN node 110 may determine at least one adjusted, updated and/or dynamic WPT control parameter based on the reported energy harvesting capability information, WPR setting information and/or RSRP measurement values received from the UE devices 120 and/or 130, etc. More specifically, the RAN node 110 may determine which UE is associated with which WPT beam, calculate the pathloss associated with the UE device receiving the specified and/or desired WPT beam, and then determine the adjusted transmission power of the WPT beam based on the calculated actual pathloss and the UE's power receiving window setting/category information, etc., but the example embodiments are not limited thereto.

For example, the RAN node may calculate the desired and/or ideal transmission power to use for the WPT waveform using the following equation:

$$P_j = \min\left\{\frac{W_i}{PL_i}\right\}, i \in B_j$$

Where UE i is associated with beam index j; the receiving power window upper bound of the $UE_i$ is $W_i$, the lower bound is $M_i$, and the pathloss estimated from the RSRP measurement is $PL_i$, and $B_j$ is the set containing all UEs associated with beam j.

According to some example embodiments, if $P_j<M_i$ for any $i \in B_j$, the RAN node 110 may reschedule UE i to another beam which could provide higher power transfer.

In operation S4070, the RAN node 110 may transmit and/or broadcast an adjusted and/or updated WPT waveform for one or more of the WPT beams based on the adjusted and/or updated transmission power calculated in operation S4060.

Additionally, the UE devices 120 and/or 130 may repeat operation S4050 and the RAN node 110 may repeat S4060 to S4070 on a periodic basis, when one or more of the UE devices 120 and 130 change geographic locations (e.g., the mobility of the UE device, etc.), a blocking cluster (e.g., one or more objects blocking the UE from having line of sight with the RAN node 110, etc.), and/or any other channel changes or pathloss changes of the UE device, but the example embodiments are not limited thereto.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A radio access network (RAN) node, comprising:

a memory storing computer readable instructions; and processing circuitry configured to execute the computer readable instructions to cause the RAN node to, determine at least one wireless power transmission (WPT) control parameter for each sector of a plurality of beams and a pathloss associated with each sector of the plurality of beams, each beam of the plurality of beams including a plurality of sectors; and transmit a WPT signal on the at least one beam of the plurality of beams based on the at least one WPT control parameter, the WPT signal received by at least one user equipment (UE) device.

2. The RAN node of claim 1, wherein the at least one WPT control parameter includes at least one of:

WPT transmission time domain resource information, WPT frequency domain resource information, or WPT waveform information.

3. The RAN node of claim 1, wherein the RAN node is further caused to:

determine the at least one WPT control parameter associated with the at least one beam based on a wireless power reception (WPR) setting associated with the at least one UE device, and the WPR setting includes at least one of, a power receiving window setting associated with at least one power receiving category, an upper bound of a power receiving window of the at least one UE device, or a lower bound of the power receiving window of the at least one UE device.

4. The RAN node of claim 1, wherein the RAN node is further caused to determine the at least one WPT control parameter associated with the at least one beam by:

determining a plurality of default WPR settings associated with a plurality of WPR-capable UE device types, respectively;

estimating an expected pathloss of the at least one UE device receiving the at least one beam based on a sector of the at least one beam in which the at least one UE device is located; and determining the at least one WPT control parameter based on the determined plurality of default WPR settings and the estimated expected pathloss.

5. The RAN node of claim 4, wherein each of the default WPR settings of the plurality of default WPR settings includes a default power receiving window setting of the respective WPR-capable UE device type; and the RAN node is further caused to determine the at least one WPT control parameter by, determining a lowest upper bound of power receiving windows corresponding to each of the WPR-capable UE device types among the plurality of default power receiving window settings; and determining the at least one WPT control parameter based on the determined lowest upper bound and the estimated expected pathloss.

6. The RAN node of claim 1, wherein the RAN node is further caused to:

receive a WPR setting associated with the at least one UE device, the received WPR setting including at least one of a power receiving window setting associated with the at least one UE device, a WPT power measurement information measured by the at least one UE device in response to the transmitted WPT signal, a WPT beam identifier associated with the transmitted WPT signal, or a power receiving time setting associated with the at least one UE device.

7. The RAN node of claim 6, wherein the WPR setting includes at least the power receiving window setting associated with the at least one UE device, the WPT power measurement information measured by the at least one UE device in response to the transmitted WPT signal, and the WPT beam identifier associated with the transmitted WPT signal; and the RAN node is further caused to:

determine a dynamic pathloss of the at least one UE device based on a sector of the at least one beam in which the at least one UE device is located;

adjust the at least one WPT control parameter based on the power receiving window setting of the at least one UE device and the determined dynamic pathloss; and transmit an adjusted WPT signal on the at least one beam based on the adjusted at least one WPT control parameter.

8. The RAN node of claim 7, wherein the RAN node is further caused to adjust the at least one WPT control parameter in response to changes to the dynamic pathloss of the at least one UE from UE channel changes.

9. A user equipment (UE) device, comprising:

a memory storing computer readable instructions; and processing circuitry configured to execute the computer readable instructions to cause the UE device to, receive at least one wireless power transmission (WPT) control parameter for each sector of at least one beam of a plurality of beams from at least one radio access network (RAN) node, each beam of the plurality of beams including a plurality of sectors, receive a WPT signal on the at least one beam transmitted by the at least one RAN node based on the at least one WPT control parameter, and harvest the received WPT signal as stored energy.

10. The UE device of claim 9, wherein the at least one WPT control parameter includes at least one of:

WPT transmission time domain resource information, WPT frequency domain resource information, or WPT waveform information.

11. The UE device of claim 9, wherein the UE device is further caused to:

transmit a wireless power reception (WPR) setting to the at least one RAN node, the WPR setting including at least one of, a power receiving window setting associated with the UE device, an upper bound of a power receiving window of the UE device, or a lower bound of the power receiving window of the UE device.

12. The UE device of claim 9, wherein the UE device is further caused to:

measure reference signal received power (RSRP) of the received WPT signal on the at least one beam; and transmit received WPT power measurement information to the at least one RAN node, the received WPT power measurement information including the measured RSRP of the received WPT signal and an associated WPT beam identifier.

13. The UE device of claim 12, wherein the UE device is further caused to:

receive an adjusted WPT signal on the at least one beam in response to the transmitted received WPT power measurement information.

14. The UE device of claim 12, wherein the UE device is further caused to:

transmit the received WPT power measurement information to the at least one RAN node in response to UE channel changes.

15. A method of operating a radio access network (RAN) node, comprising:

determining at least one wireless power transmission (WPT) control parameter for each sector of a plurality of beams and a pathloss associated with each sector of the plurality of beams, each beam of the plurality of beams including a plurality of sectors; and transmitting a WPT signal on at least one beam of the plurality of beams based on the at least one WPT control parameter, the WPT signal received by at least one user equipment (UR) device.

16. The method of claim 15, wherein the at least one WPT control parameter includes at least one of, WPT transmission time domain resource information, WPT frequency domain resource information, or WPT waveform information; and the determining the at least one WPT control parameter associated with the at least one beam includes determining the at least one WPT control parameter based on a wireless power reception (WPR) setting associated with the at least one UE device, the WPR setting including at least one of, a power receiving window setting associated with at least one power receiving category, an upper bound of a power receiving window of the at least one UE device, or a lower bound of the power receiving window of the at least one UE device.

17. The method of claim 15, wherein the determining the at least one WPT control parameter associated with the at least one beam further includes:

determining a plurality of default WPR settings associated with a plurality of WPR-capable UE device types, respectively;

estimating an expected pathloss of the at least one UE device receiving the at least one beam based on a sector of the at least one beam in which the at least one UE device is located; and determining the at least one WPT control parameter based on the determined plurality of default WPR settings and the estimated expected pathloss.

18. The method of claim 17, wherein each of the default WPR settings of the plurality of default WPR settings includes a default power receiving window setting of the respective WPR-capable UE device type; and the determining the at least one WPT control parameter further includes, determining a lowest upper bound of power receiving windows corresponding to each of the WPR-capable UE device types among the plurality of default power receiving window settings, and determining the at least one WPT control parameter based on the determined lowest upper bound and the estimated expected pathloss.

19. The method of claim 15, further comprising:

receiving a WPR setting associated with the at least one UE device, the received WPR setting including at least one of, a received WPT power measurement information measured by the at least one UE device in response to the transmitted WPT signal, a WPT beam identifier associated with the transmitted WPT signal, or a power receiving time setting associated with the at least one UE device.

20. The method of claim 15, further comprising:

determining a dynamic pathloss of the at least one UE device based on a sector of the at least one beam in which the at least one UE device is located;

adjusting the at least one WPT control parameter based on a power receiving window setting of the at least one UE device and the determined dynamic pathloss; and transmitting an adjusted WPT signal on the at least one beam based on the adjusted at least one WPT control parameter.

* * * * *